G. W. BOWERS.
PLURAL RECORD PHONOGRAPH.
APPLICATION FILED DEC. 19, 1912. RENEWED JUNE 25, 1917.
APPLICATION FILED JAN. 13, 1920.
1,326,473.
Patented Dec. 30, 1919.
5 SHEETS—SHEET 1.
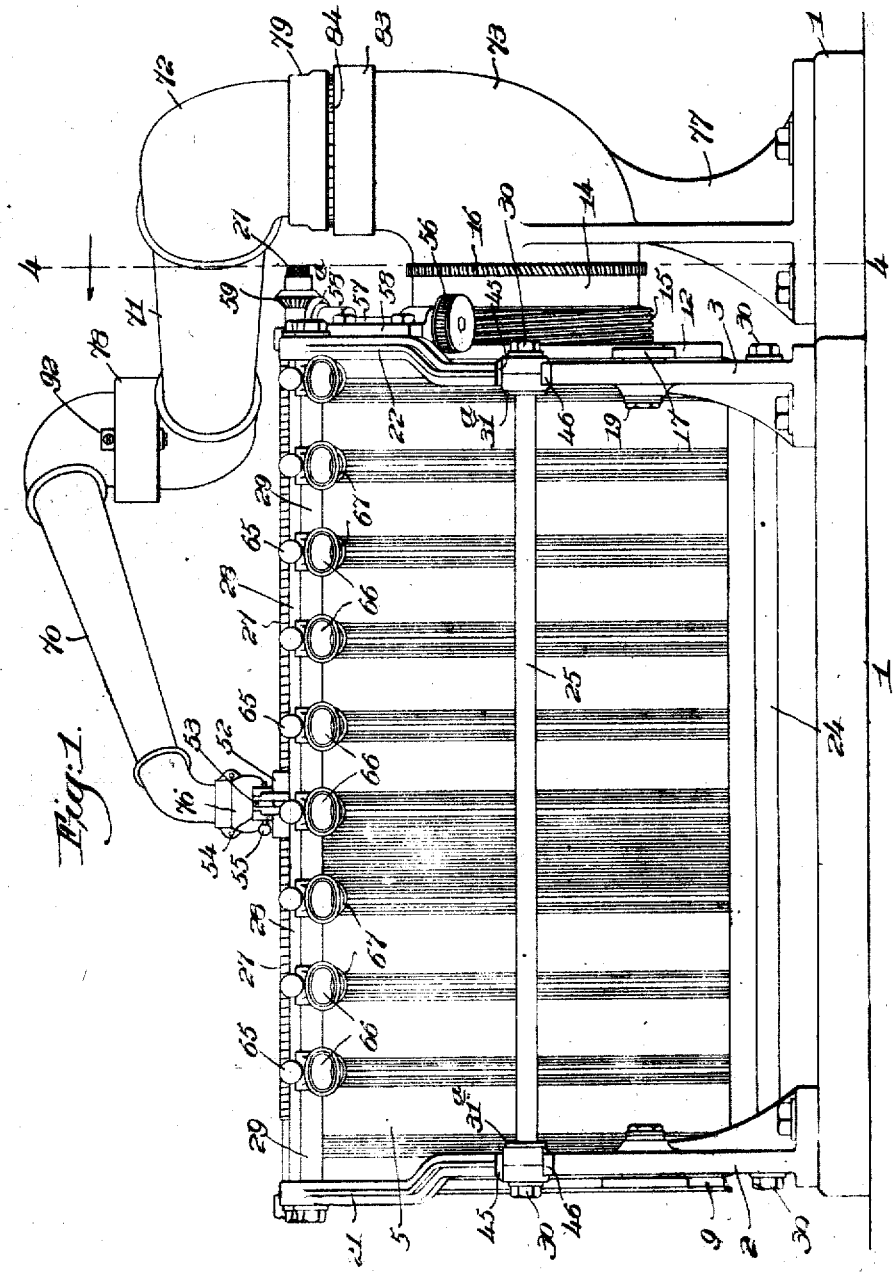

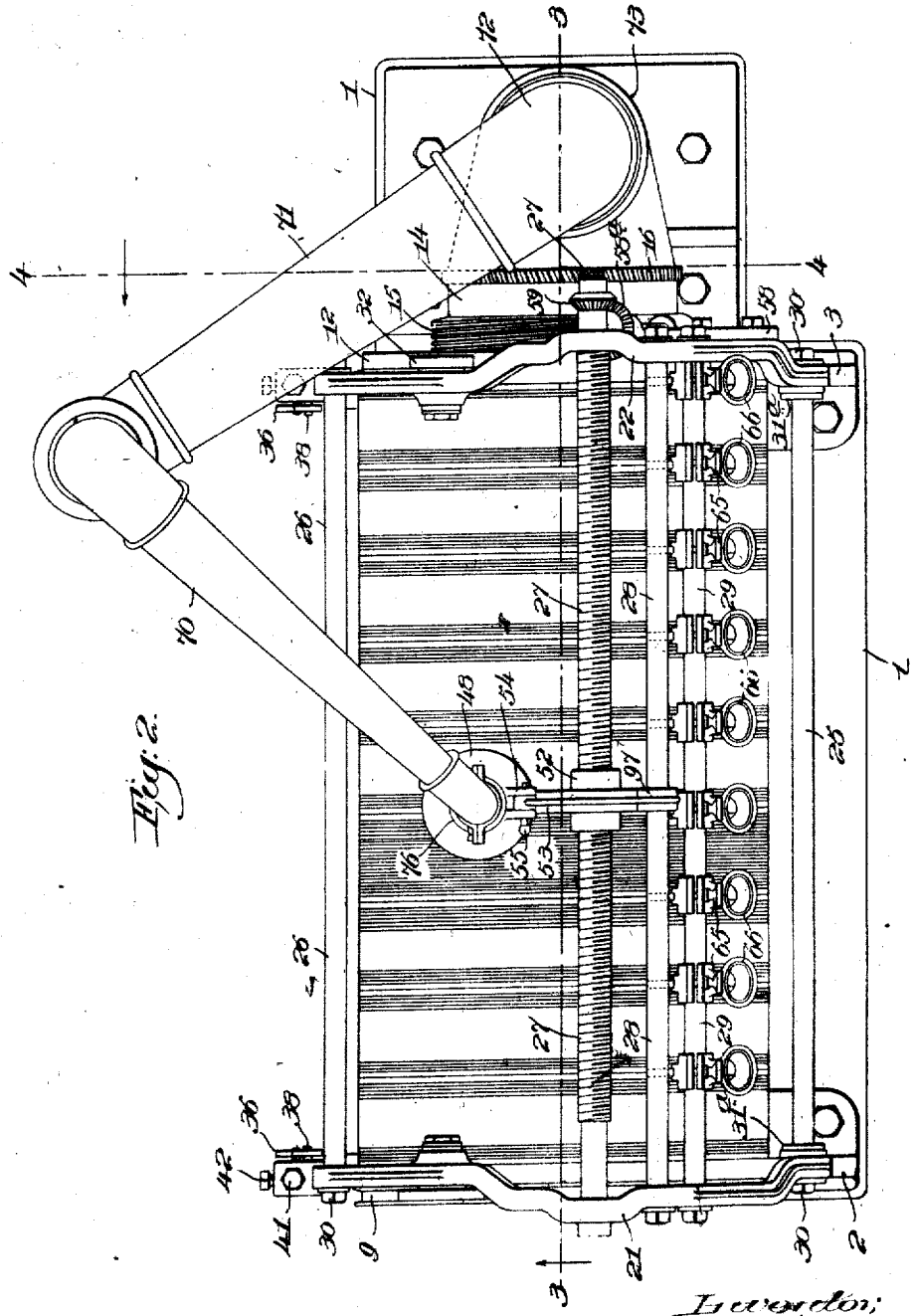

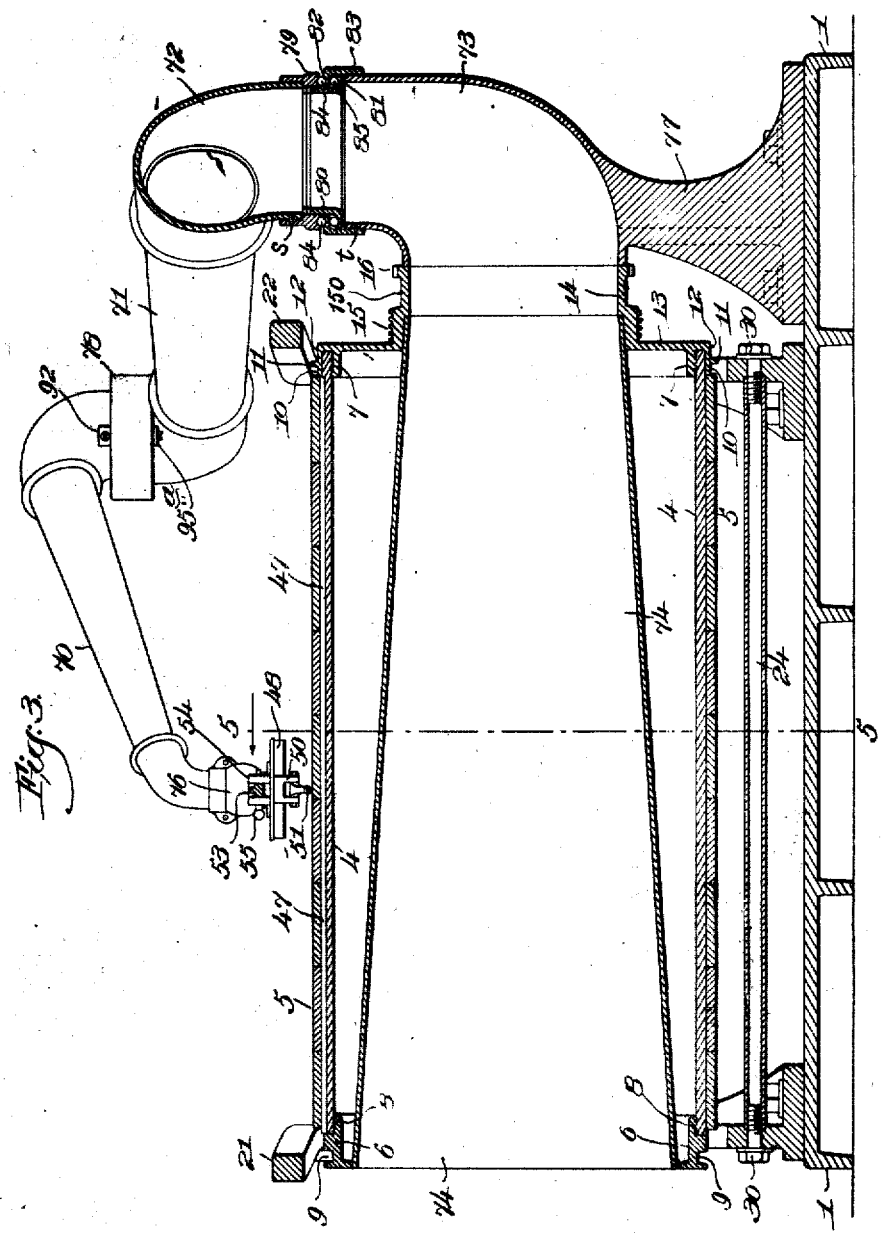

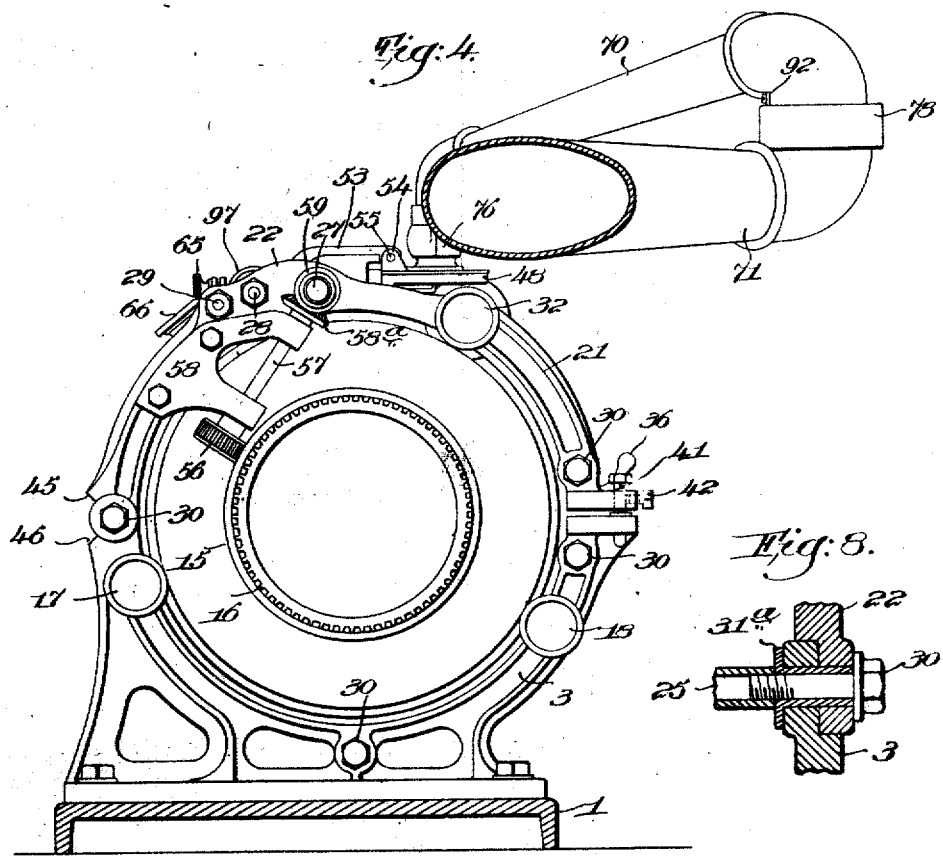

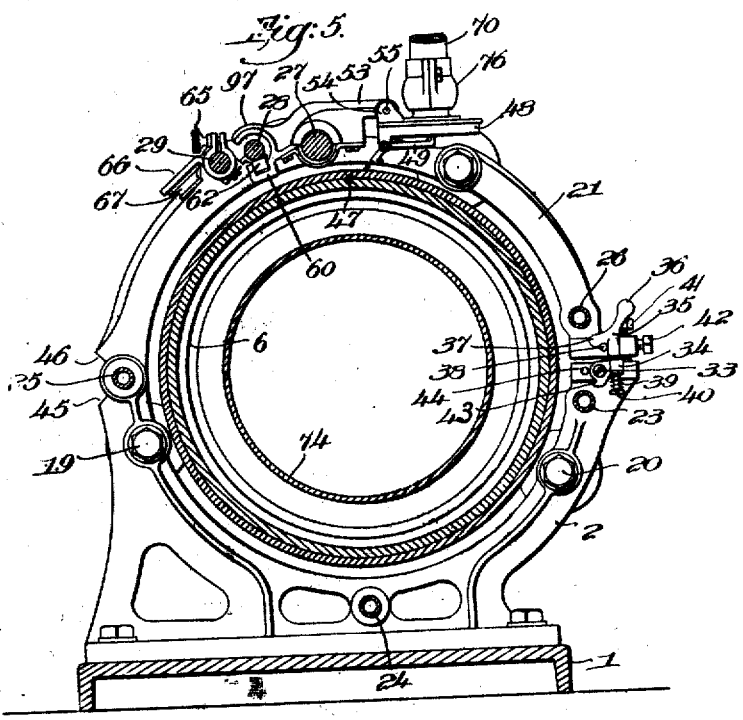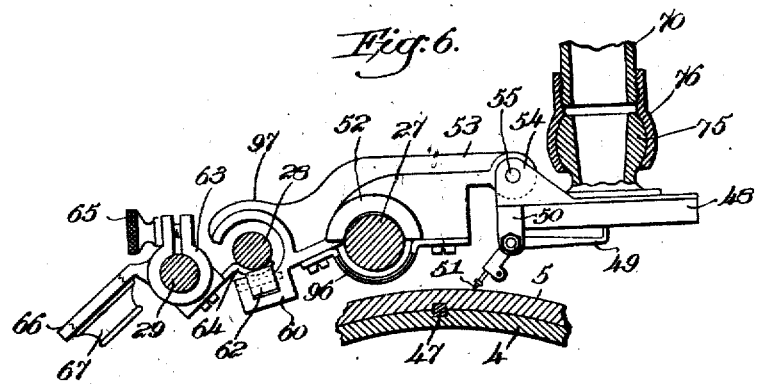

UNITED STATES PATENT OFFICE.

GEORGE W. BOWERS, OF SOMERVILLE, MASSACHUSETTS.

PLURAL-RECORD PHONOGRAPH.

1,326,473.   Specification of Letters Patent.   Patented Dec. 30, 1919.

Application filed December 19, 1912, Serial No. 737,598. Renewed June 25, 1917. Serial No. 176,922.

*To all whom it may concern:*

Be it known that I, GEORGE W. BOWERS, a citizen of the United States, and resident of Somerville, in the county of Middlesex and State of Massachusetts, have invented certain new and useful Improvements in Plural-Record Phonographs, of which the following is a specification.

The present invention relates to machines of the sort known as "phonographs", "graphophones", or "talking machines", which are adapted to reproduce sounds by the coöperation of a stylus or other reproducing element with a member, known as a "record", which is carried by a moving part of the machine and is so prepared that, when relative motion occurs between the record and the reproducing element, it may vibrate the latter in a manner corresponding to sonorous vibrations. Such machines are generally provided with amplifying horns by which the volume of sound produced by the reproducing means is enlarged.

The principal objects of my invention are three in number:—first, to provide improved means for carrying a plurality of records and reproducing the sounds recorded upon them in succession without stopping the machine and without shifting the records; second, to make the record holder constitute part of the amplifying horn; and third to provide a machine in which the amplifying horn, or a part of it, is put in motion about its longitudinal axis. These and other, subsidiary and supplemental, objects, the nature of which hereinafter appears, are accomplished by means fully disclosed and set forth in the following specification, in connection with the accompanying drawings. Such drawings, and the description in detail thereof, following, illustrate the embodiment of my invention in one concrete machine, without being intended to limit the principles of the invention to any particular machine or in any way to restrict the scope of the invention.

In the accompanying drawings,

Figure 1 is a side elevation of the machine.

Fig. 2 is a plan view.

Fig. 3 is a longitudinal central section of the machine on line 3—3 of Fig. 2.

Fig. 4 is an end elevation of the machine viewed from the line 4—4 of Fig. 1 and 2.

Fig. 5 is a cross section of the machine taken on line 5—5 of Fig. 3 looking toward the left.

Fig. 6 is a sectional elevation in detail on an enlarged scale of the means for controlling the movements of the sound reproducing device.

Fig. 7 is a sectional view of a ball bearing joint constituting a detail of the amplifying horn.

Fig. 8 is a sectional view of a detail of construction.

The same reference characters indicate the same parts in all the figures.

In the drawings 1 represents a base or bed to which are secured the frames 2 and 3 for supporting the record holder. Said frames are secured to the base at a distance apart determined by the length of the record holder, which is supported at its ends by the frames.

As appears best from Fig. 3, the record holder is a tube or cylinder 4 adapted to support records which are indicated at 5, and are shown here as being rings of relatively large diameter and short axial extent. Without limiting myself in any way to the material from which the record holder may be made, I may state that I prefer to make it of some material which is light in weight and is at the same time tough and rigid. The material known as bakelite answers these requirements and is the material which I have chosen for this purpose. At the ends of the cylinder 4 are mounted rings 6 and 7 of metal, preferably McAdamite metal, for the purposes of providing tracks or runways for the rolls, or other supporting elements of the supporting frames to occupy, of stiffening and strengthening the holder, and of providing gears for driving and being driven, as will presently appear. The ring 6 at the left hand end of the record holding cylinder has a lip 8 which is screwed into the end of the cylinder 4, and a shoulder adjacent to such lip adapted to be brought up against the end of the cylinder. In its outer surface this ring has a groove 9 which provides a runway or track occupied by supporting and holding rolls which I am about to describe.

The other ring 7 has an inner lip or flange which is threaded into the opposite end of the cylinder 4 and an outer concentric lip 10 adapted to lie outside of the cylinder and to form an abutment for the records at one end of the holder. Said lip 10 has also a flange or fin 11 which defines one edge of the runway or track 12. Said ring 7 is also equipped with a transverse web 13 from which there extends a sleeve 14 concentric with the outer circumference of the ring, on part of which there is formed a worm 15 and on another part of which is formed a worm wheel or spiral gear 16. Said worm and spiral gear are well shown in Fig. 1.

The frames 2 and 3 approximate the form of a semicircumference and thereby embrace the under half of the record holding cylinder. Each frame is equipped with two or more supporting elements such as rolls 17 and 18, shown in Fig. 4, which have ball bearing mounts upon studs 19 and 20, respectively, secured in the frames, and occupy the tracks or runways 9 and 12, respectively, of the end rings of the record holder. These rolls in the two frames provide a four point anti-friction support for the record holder whereby the latter is enabled to rotate smoothly, evenly, and silently when driven.

Pivotally connected with each supporting frame is a holding frame, such holding frames being indicated at 21 and 22. The said holding frames and supporting frames together, when in the position shown in the drawings, form complete circumferences inclosing the ends of the record holder. Tie members extending parallel to the axis of the record holder pass from the frames at one end to corresponding points on the frames at the other end. Such members for the fixed supporting frames are indicated at 23, 24, and 25, the latter serving also as the pivot for the swinging holding frames, while the tie members for the swinging frames are indicated at 26, 27, 28, and 29. The members 27, 28 and 29 have other functions beside that of tying the frames or arms 21 and 22 together, as will presently be shown. Conveniently the members 23, 24, 25, and 26 are tubes terminating at their ends at or within the inner faces of the frames to which they are secured by bolts 30 as clearly shown in Fig. 3 in connection with the tie member 24. The construction of the member 25 is somewhat modified from that indicated in order to provide pivots of which the frames or arms 21 and 22 may swing without binding. The ends of said tie member 25 abut against bushings 31ª which pass through the overlapping portion of the fixed and swinging frames. The bolts 30 pass through such bushings and are threaded into the tube. The overlapping parts of the fixed and swinging frames, which thus form a knuckle joint or hinge are confined between the head of the bolt 30 and a flange on the end of the bushing 31ª, said bushing being of such a length that the knuckle joint is not bound or gripped between the bolt head and flange. Each of the holding frames or arms 21, 22, carries one or more anti-friction rolls 32 similar to the rolls 17 and 18, occupying the tracks of the record holder and serving as an anti-friction means to confine the record holder to the supporting rolls. I do not intend to limit the invention to the use of anti-friction means such as the rolls 17, 18, and 32 as the supporting elements constituting the parts of the supporting frames which directly engage the record holder, as it is within my contemplation to use other elements than rolls, which elements need not be movable relatively to the frames, or even to omit the rolls or equivalents thereof altogether.

When the holding frames are in position as shown in the drawings they are yieldingly held by spring catches, one of which is shown particularly in Fig. 5. Such catch consists of a dog 33 pivoted to the frame 2 near the upper end thereof and having a sleeve 34 through which the shank of a latch 35 extends. Said latch has a handle 36 and a toe 37 adapted to take over a pin 38 on the adjacent end of the swinging frame 21. A spring 39 is interposed between the sleeve 34 and the head 40 on the latch shank, thereby drawing the latch against the pin 38. An adjustable stop 41 is provided in the form conveniently of a screw, threaded through a flange on the end of the swinging frame, and adapted to bear on a hardened anvil set into the adjacent part of the fixed frame, said adjustable stop being secured in its adjustments by a set screw 42. By these means the holding rolls 32 of the holding frames may be held always contiguous to the record holder, and be capable of yielding in case there should be any irregularities in the shape of the record holder. The latch dog 33 is provided with a finger 43 adapted to stop against a pin 44 when the latch is released and turned aside. Each of the fixed frames 2 and 3 has such a latch adapted to engage the coöperating swinging frame.

The swinging frames may be swung up out of the way so as to leave the record holder unobstructed and enable it to be picked up and removed from the machine for the purpose of placing or removing records. When such swinging frames are turned up they move as a unit, being rigidly connected by the tie members previously described, and when turned aside so far as to clear the record holder they are arrested by the coming into contact of complemental shoulders 45, 46 on the fixed and swinging frames.

One of the important features of the invention is the provision for mounting a plurality of records upon one holder, so that the sounds recorded on all the records may be reproduced in succession without requiring attention until all the records have been used. In order to accomplish this object without making the record holder unduly long I have designed a new type of record, which is ring shaped, rather than cylindrical. By this distinction I mean that the diameter of the record is very large in proportion to its axial length. As an indication of the proportions of the records I will say that the diameter may be in the neighborhood of nine and one-half inches, while the axial extent may vary from one inch to three or more according to the length of the record. Ordinarily the length will be about two inches but in some cases it may be desirable to make the record as long as the entire holder, as for recording a long speech, etc. The record holder is large enough in diameter to fit within these ring shaped records and is made long enough to hold as many records as may be desired. Rotation of the records on the holder is prevented by a spline 47 set into or on the holder, each of the records having a longitudinal groove in its inner surface to receive such spline. When a number of records are placed on the cylinder at one time they are so placed as to abut against one another as shown in Figs. 2 and 3.

For reproducing sounds recorded on the records I provide a reproducing device in the nature of a sound box 48 of any common or other construction, containing a diaphragm which is operated by a lever 49 pivoted to a bracket 50 on the sound box and carrying a stylus 51 which engages the record. The machine here illustrated is of that type in which the treatment of the record consists in producing a groove in its surface of irregular depth, the irregularities corresponding to the sound waves, and in so arranging the stylus and the diaphragm operating arm that the arm is vibrated up and down by the contact of the stylus with the sound groove. I desire to state, however, that the essential features of my invention are not restricted to a machine of this type, for I make no claim to any particular sound box or reproducing device, and reserve the right to apply the principles of the invention as set forth in the appended claims to other types of machine having other sorts of reproducing apparatus and in which the record may be otherwise prepared, as by laterally undulating or offset grooves.

I will now describe the means for feeding the sound reproducing device and for conducting it from one record to another, which constitutes another important feature of my invention.

One of the members as 27, which I have heretofore referred to as a tie member, is a lead screw having bearings in the swinging frames 21 and 22. Coöperating with and resting upon this lead screw there is a half nut 52 from which an arm 53 leads, such arm being connected with the sound box by means of ears 54 on the sound box between which the end of the arm lies, and a pin 55 passing through the arm and ears. The lead screw is rotated synchronously with the record holder by the worm 15, previously described, which meshes with a worm wheel 56 on a shaft 57 supported by a bracket 58 which is secured to swinging frame arm 22. Said shaft 57 carries a bevel gear 58$^a$ meshing with a bevel gear 59 on the lead screw. Thus whenever the record holder is rotated the lead screw is rotated and the sound box is fed along the record holder. The gear ratio of the drive, and the pitch of the lead screw are proportioned so that the sound box progresses at a rate corresponding to the pitch of the groove in the record.

The half nut has a second arm 60 projecting under the rod 28 which I have heretofore referred to as one of the tie members, and carrying an anti-friction roll 62 which rolls along the under side of the rod 28. On the adjacent longitudinal rod 29, which is also one of the tie members previously mentioned, there are mounted collars 63 each of which carries a finger 64 lying under the rod 28 and constituting a cam projection. That is, the fingers 64 while supported independently of the rod 28, yet constitute in effect cam protuberances on said rod. When the anti-friction roll 62 in traveling along the rod 28 encounters one of these cam protuberances it is depressed, thereby elevating the arm 53 and so far lifting the sound box attached thereto that the stylus is lifted from the surface of the record. These cam protuberances 64 are provided in order to lift the stylus in passing from one record to another and to place it properly in the commencing portion of the next record.

As records or, at least, the grooved surfaces of the records, may vary in axial length according to the length of the compositions recorded upon them, it is necessary that these cam protuberances be made adjustable, as otherwise the stylus would not be lifted at the proper times in all cases to be carried from the end of the groove in one record and laid at the desired point in the record groove of the next record. It is for this reason that the cam protuberances are made separate and are adjustably mounted upon the rod 29. The collars 63 carrying these cam fingers are provided with clamping screws 65 by which they may be caused to grip or release the rod 29. Hence each collar may be shifted with its finger 63 into any desired position on the rod 29 and there clamped. Projecting from said collar 63 on the front side of the rod 29 there is another arm 66 formed as a ring or eye in which there is detachably mounted a lens holder 67 carrying a magnifying lens. Said lens holder, as is indicated in Fig. 6, is detachably connected by a screw thread with the internally threaded aperture of the ring-shaped arm 66. The cam projection or finger 64 retains the lens holder in the position shown in Figs. 5 and 6 with respect to the record holder, the axis of the lens being radial to the holder and the lens being at such a distance from the record thereon as to focus on the record surface. Preferably there is an index mark upon the lens which can be viewed by the operator at the same time that the record groove or a definite index mark on the record is seen through the lens. The purpose of the index mark on the lens is to secure an exact setting of the adjustable cam finger at such a point with relation to the record grooves on two abutting records as to cause the stylus of the sound reproducer to be lifted from one record at or just beyond the point where the record of sound on that record ends, and be carried over the intervening blank portions of the records and deposited in the groove of the next record near the point where the record of reproducible sound vibrations on the latter begins. It is to be remembered that ordinarily there is a blank space at each end of a record whereon either there is no record groove at all, or where there may be a groove which is not of such a character as to vibrate the reproducer in such a way as to produce musical or articulate sounds. The cam causes the reproducer to be held out of contact with the records while passing over the contiguous blank spaces of two adjacent records so as to avoid causing unnecessary and unpleasant scratching or rasping sounds between the reproduction of the contents of two successive records. By "blank spaces" in this connection I mean those parts of the records, whether provided with grooves or not, whereof contact and relative movement with and respect to the reproducer will not produce sounds which form any part of the indicated sound contents of the record. Each of the cam fingers is equipped with a lens having such an index, by the use of which each cam finger may be so set with respect to the adjacent records as to cause the stylus to pass from the desired point on each to the desired point on the next, whatever the widths of the various records may be, making it unnecessary that the record be of a uniform width or of any standard width. Thereby the machine is adapted to commence and continue the reproduction of the contents of the several records in succession with intervals of silence between the ending of one and the beginning of the next, and without producing preliminary or intermediate objectionable sounds.

This provision for adjusting the means for lifting the reproducing device in accordance with the varying widths of records is a novel feature with my invention and is essential to the use of the invention.

The vibrations produced in the diaphragm of the sound box by the stylus are transmitted in the form of sound vibrations through an amplifying horn consisting of the sections 70, 71, 72, 73 and 74. The first of these sections is connected to the sound box through a coupling shown in detail in section in Fig. 6, such coupling being essentially a ball and socket joint consisting of a nipple 75 on the sound box having a spherical exterior and a sleeve 76 secured to the end of the horn section 70 and projecting therefrom in the form of a segment of a spherical shell. This joint permits free play of the sound box when the latter is raised and lowered by the arm 53, which swings in a short arc.

The horn sections 70, 71 and 72 are all supported by the section 73, which is an elbow section having a base 77 or pedestal, secured on the machine base 1 near the end of the record holding cylinder but independently of the cylinder and cylinder-supporting frames.

Horn section 71 is an intermediate section between the fixed section 73 and that section 70 which is connected to the sound box, and is provided so that the connection between the moving sound box and the stationary horn section may be maintained in all positions of the sound box. Consequently, this intermediate section is connected at its ends by swivel joints 78 and 79 with the adjacent sections. These swivel joints are preferably equipped with ball bearings to make the frictional resistance as little as possible. Although the precise nature of the joint is not material to the more important aspects of the invention, yet the joints are in themselves of sufficient importance to warrant detailed description.

The joint 79 comprises a ring or ferrule screwed on to the elbow end of the horn section 71 and having its mouth internally threaded. Screwed into the internal thread of this ferrule is a sleeve 80 having an outwardly turned flange 81. in the side of which toward the ferrule 79 there is a ball race. Another ball race is formed in the end of ferrule 79. Between this ferrule and the flange 81 is contained the inwardly turned flange 82 of a ring 83 which extends outside of and beyond the flange 81 and is internally threaded to make the screwed connection with the upper end of the horn section 73. A series of balls 84 are contained between the ferrule 79 and flange 82, and another series of balls 85 are contained between the flanges 81 and 82. This bearing is of a character which permits separable attachment to both of the sections connected thereby, and it also makes provision for adjustment so that the balls will neither be too loose nor be bound too tightly. This swivel joint is shown in sectional view in Fig. 3. Both the members 79 and 83 are locked to the horn sections whereon they are mounted, by means of locking screws s and t, respectively.

The joint 78 is shown in detail sectional view in Fig. 7. It includes a collar 86 screwed upon the exterior of the section 70, a collar 87 screwed on the horn section 71 and an outer sleeve or ring 78. Ring 86 has a flange 88 projecting between the collar 87 and a flange 89 on the sleeve or casing 78. Between these flanges and the ring 87 are two sets of balls 90 and 91 respectively. The collars 86 and 87 are adjustable on the horn sections 70 and 71 respectively, and the ring 78 is adjustable on the collar 87, thus adjusting the bearings for the balls. Collar 86 is then locked by a key 92 on the horn section 70 which is adapted to enter a notch 93 in the collar 86. The collar 87 and ring 78 are secured together without possibility of impairment of their relative adjustments by means of a lock washer 94, a lock nut 94<sup>b</sup> and a key 95. The lock washer has an ear 94<sup>a</sup> which enters a groove or keyway in the collar 78; the lock nut 94<sup>b</sup> is screwed into the threaded interior of ring 78 far enough to hold the washer against the collar 87, and the key 95 is attached to the lock nut by a screw 95<sup>a</sup> so as to project into a hole or recess in the side of the section 71, all as shown in Fig. 7.

The two sections 70 and 71 together are at least as long as the entire length of the machine, whereby the sound box may travel freely to the end of the record most remote from the fixed section 73.

I have referred to the horn section 72 as a separate element. It is separate from the section 71 only in the sense that it is made separately for convenience of manufacture. After being assembled with the part 71 these two sections are inseparable and are not relatively movable, so that they become in effect one section.

The final section 74 of the horn is contained in the record holder 4. It may be a flaring member, as shown in Fig. 3, to form a continuation on a gradually enlarging diameter of the other sections, but it is not necessarily so made. It is within the contemplation of my invention to leave out any separate element like the conical tube 74 within the record holder and leave the interior of said record holder entirely open whereby the outer walls of the record holder form also the outer walls of the terminal horn section. Whether the record holder constitutes the horn with or without an internal member like the tube 74, the fact is the same that the terminal horn section extends through the record holder and is rotated at all times while the machine is in operation.

A close joint is made between the sleeve member 14 of the record holder, which is the entrance portion of the terminal horn section, and the stationary horn section 73. The abutting ends of this sleeve and the horn section are finished off on a plane perpendicular to the axis of rotation of the record holder so that practically a tight joint without friction is provided. These members are close together without being actually in contact, and the joint is thus sufficiently tight to avoid any impairment in the volume and quality of sounds delivered from the horn.

It will be understood from the foregoing that the horn section 73 with its pedestal 77 constitutes the support for the swinging horn sections and that it is mechanically independent of the terminal section. It will be further understood, however, that there is a perfect continuation between all of the horn sections and a gradual enlargement in diameter of the horn, having the same effect as a horn made in one piece with a straight axis and uniformly flaring side walls. Finally, the inclusion of the terminal section in the record holder permits a saving in space and at the same time enables the terminal opening of the horn to be sufficiently large to deliver a great volume of sound. I have found by experiments that a very long horn having a gradual taper to a terminal opening of comparatively large diameter gives excellent effects in the reproduction of sound. My horn, although made in sections, is of substantially the same proportions as such a horn and secures the same effects. It is, however, so built and arranged as to be economical of space and its final and largest section requires no provision of space whatever because it is within the record holder. These horn sections should be as light as possible consistent with strength and the proper degree of rigidity. The material which I prefer to use in making them is McAdamite metal, which is the lightest material, possessing also the other desirable qualities known to me. I wish it to be understood, however, that in mentioning this material, I have not intended to limit myself in any way to the employment of any particular material or to exclude the use of any other material than that named, in case I should find it desirable to use other material.

The applying and removing of records is a simple matter. All that is necessary to be done primarily to change records is to disconnect the sound box from the arm 53 by removing pin 55, to swing the horn section 70, with the sound box, aside, to disconnect the latches 35, and swing back the swinging holding frames 21 and 22 which are so connected as to swing in unison. The record holder is then entirely uncovered and may be lifted from the stationary cradle frames 2 and 3. In being thus lifted, it comes away easily from the horn section 73, as there are no overlapping joints between this horn section and the record holder. The worm gear 56 for driving the lead screw is removed from the worm 15 by this swinging back of the holding frame, so that such worm gear does not obstruct the removal of the record holder. Then, records already on the holder may be slipped off and others placed upon it, the key or spline 47 automatically alining the records properly. Thereupon the record holder may be replaced and the holding frame returned. In this replacement of the holder it is located in exactly the proper position by means of the rolls entering the track grooves 9 and 12, the flanges flanking such grooves giving the holder the exactly correct position and keeping it from moving endwise from such position.

When the holding frame is swung back and is arrested by the shoulders 45, 46, after swinging through about 90° of arc, the half nut 52 is then at the side of the lead screw and is not supported by the screw. However, this nut and the sound-box-carrying arms are not allowed to fall out of position, being held both by a strap 96 fastened to the arm 53 and passing under the lead screw, and by a finger 97 which extends over the guide rod 28 on the opposite side of said rod from the arm 60. Although the strap 96 is near enough to the lead screw to retain the nut as described, yet is at the same time far enough below the lead screw to allow the nut 52 to be entirely disengaged from the threads of the screw preliminary to a return of the nut and sound box to the beginning end of the record holder or to any other point when a reproduction of a record is to be commenced.

The described construction of nut and arm illustrated in Fig. 6 thus provides for a positive feed of the sound box when reproducing the record, allows the nut and sound box to be quickly returned to the starting position without depending on a reverse rotation of the lead screw for this purpose, and holds the nut from falling away when the record retaining frame is swung aside.

The machine which I have illustrated is adapted to be mounted upon any sort of a table or stand, and accordingly may be mounted upon a cabinet adapted to contain records and inclosing a compartment in which the driving motor is contained. I have not shown any driving motor or means in connection with this machine other than the spiral gear 16. It may be considered, however, that this gear is typical of any means to which power from a driving motor may be delivered, it being immaterial to the present invention what such motor may be or how the power is taken from it. I may state, however, that for driving such a spiral gear 16, the motor would be equipped with a complementally pitched spiral pinion. The motor will be mounted in any convenient location where a shaft carrying such a pinion may extend into proximity with the gear 16. That portion of the sleeve 14 which is between the worm 15 and the gear 16 (and is designated 150) may serve as a belt pulley to take a driving belt.

I desire to state as regards some aspects of the invention, and particularly that relating to the construction of the record holder so that it may serve as a horn section, it is not essential that the record holder should be cylindrical and of no other shape. I consider that a construction in which the record holder is tubular with walls other than cylindrical, but having the other essentials of the combined record holder and horn section is within the scope of this aspect of the invention and is covered by those of the following claims which are particularly directed thereto.

I claim:

1. In a phonograph a hollow cylindrical record holder rotatably mounted, a sound reproducing device adapted to travel across the outer face of a record mounted externally upon said holder, and means external to the holder for conducting the vibrations of sound generated by said device to one end of and into the record holder.

2. In a phonograph, a rotatably mounted sound-amplifying member adapted to carry a phonograph record, a sound reproducing device adapted to travel in contact with the treated or recorded face of a record carried by said member, and means for so conducting sound waves from said reproducing device to said member that such waves are caused to pass through the member and be increased in sonority thereby.

3. A phonograph comprising in its construction a cylindrical rotatably mounted record holder, adapted to hold a plurality of annular phonograph record members mounted end to end having sound grooves on their external cylindrical faces, a sound box having a stylus arranged adjacent to said members whereby the stylus may engage the grooves thereof, a feed screw mounted parallel with the axis of said record holder, a nut engaged with said feed screw and connected with said sound box, mechanism for rotating said record holder and feed screw in synchronism, and cam elements arranged to turn said nut transversely about the axis of the feed screw and remove the stylus from the record members when the stylus passes from one such member to the next adjacent one.

4. In a phonograph a combined amplifying horn and record holder adapted to carry a phonograph record member, a sound reproducer operable by said record member, and means for conducting sound vibrations from said reproducer to said combined amplifying horn and record holder.

5. In a phonograph the combination of means for supporting a plurality of phonograph records rotatably on the same axis, a feed screw parallel with the axis of said records, a nut engaged with said feed screw and movable longitudinally thereof and transversely about the axis of the same, a sound box having a stylus adapted to engage said records and being connected with said nut, and a shaft parallel to said feed screw and having cam elements arranged to turn said nut about the screw and so arranged with reference to the records as to remove and replace the stylus for each record at the proper acoustical position.

6. In a phonograph the combination with a record holder adapted to carry a plurality of records in axial alinement, a reproducing device, a lead screw for conducting said reproducing device along the record holder, and means additional to said lead screw for displacing the reproducing device away from the record holder when passing from one record to another, said displacing means being adjustable in accordance with varying sizes of records.

7. In a talking machine a record holder, a lead screw extending longitudinally of said holder, a reproducing device, a nut engaged with said lead screw and controlling said reproducing device, a rod parallel to said lead screw, and an arm connected to said lead screw, and an arm connected to said nut extending between the rod and the holder and engaging said rod, normally holding the reproducing device in proper relation to a record on the record holder, said rod having cam elements arranged to engage and swing said arm in such a direction as to remove the reproducing device from the surface of the record.

8. In a talking machine a record holder, a lead screw extending longitudinally of said holder, a reproducing device, a nut engaged with said lead screw and controlling said reproducing device, a rod parallel to said lead screw, and an arm connected to said nut and engaging said rod, normally holding the reproducing device in proper relation to a record on the record holder, and cam elements on said rod arranged to engage said arm and swing the same in such' way as to cause the reproducing device to be removed from the record, said cam elements being adjustable along the rod to vary the point of time at which the reproducing device is so displaced.

9. In a phonograph the combination with a cylindrical record holder adapted to carry a plurality of ring-shaped records, a lead screw extending parallel with said holder, a nut engaging said lead screw and having an arm, a reproducing device carried by said arm and arranged to travel along the records, a guide rod parallel with the lead screw, a second arm extending from the nut into engagement with said guide rod normally so holding said nut and the arms thereon that the reproducing device is properly placed with respect to the records, a second rod parallel to said guide rod, and cam elements mounted upon said second rod adjustably thereon and projecting into proximity with said guide rod so as to form cam enlargements of the latter in the path of the second named nut arm.

10. The combination with a multiple record holder in a talking machine adapted to support a series of records in axial alinement, and a sound reproducer, of means for conducting said reproducer along said record holder, adjustable means for displacing said reproducer from the record holder when passing from one record to the next in the course of its continuing travel, and gaging means connected with said displacing means for enabling an accurate location of the latter.

11. A phonograph including in combination a record holder adapted to support a plurality of ring-shaped records, a lead screw extending above said record holder longitudinally thereof, a half nut resting on the upper side of said lead screw, arms extending from said half nut to opposite sides of the lead screw, a sound reproducer carried by one of said arms, a guide rod parallel with the lead screw under which the second of said arms lies, a strap connected to said arms passing under the lead screw at a distance therefrom sufficient to permit lifting of the nut out of engagement with the threads of the lead screw, and cam enlargements on said guide rod in the path of said second named arm for moving said arm, the nut, and the sound reproducer about the axis of the lead screw, whereby to lift the sound reproducer out of contact with records on the record holder.

12. A talking machine comprising in combination with a cylindrical record holder adapted to support a plurality of records arranged side by side on said holder, a lead screw parallel therewith, a guide rod parallel to said lead screw, a cam rod parallel to said guide rod, a nut engaging said lead screw having an arm engaging said guide rod and having another arm, a sound reproducer carried by said other arm adapted to engage the records on the record holder, cam members detachably fastened to said cam rod and extending into proximity with the guide rod to form a part of the surface of the latter in the path of the first named nut arm, and a magnifying glass, having an index mark, connected with each of said cam members and so held as to focus upon a record, said glass and index serving to determine the position of the cam necessary to cause separation of the reproducing device from one record and return to the next record at the proper acoustical points.

13. A talking machine comprising a holder adapted to hold a number of phonograph records end to end in series, a sound reproducer, means for causing said reproducer to travel continuously across the faces of said records in series, adjustable means for displacing and replacing said reproducer respectively from and upon the records during its travel, and an index member associated with said displacing means and adapted to coöperate with indications on the records to locate said displacing means in desired relation to the records.

14. A talking machine comprising a holder adapted to hold a number of phonograph records in series, a sound reproducer, means for causing said reproducer to travel across the faces of said records in series, adjustable means for displacing and replacing said reproducer respectively from and upon the records during its travel, and a lens associated with said displacing means and so held as to focus on the record, and having an index portion adapted to coöperate with an indication on the record to enable said displacing means to be located in desired relation to adjacent records.

15. In a machine of the character described, the combination with an adjustable device for displacing and replacing a sound reproducer, of an index member for enabling accurate location of said device, consisting of a lens connected with said adjustable device and having an index mark.

16. In a talking machine the combination with a cylindrical record holder adapted to support a record on its exterior having runways at its opposite ends of less diameter than the record supporting part of the holder, supporting frames adjacent to such opposite ends, and means on said supporting frames entering said runways and supporting the record holder.

17. In a talking machine the combination with a tubular cylindrical record holder constructed to support externally a longitudinally alined series of records, of stationary supporting frames adjacent to the ends of said holder and constructed to surround the under sides of such ends, said frames having supporting means engaging the record holder peripherally, and the record holder having means coacting with said supporting means for preventing longitudinal movement of the record holder and holding frames connected to said supporting frames overlying the ends of the record holder and having members engaging the record holder peripherally.

18. In a talking machine, the combination with a cylindrical record holder constructed with provision for receiving detachably and securing, on its exterior, a longitudinally alined series of records, of supporting and retaining means for said holder including a member underlying the end of said holder, and a complemental member connected with the first member, overlying the said end of the holder, said members and the record holder having interengaging portions or devices arranged to prevent movement of the holder endwise relatively to the retaining means.

19. In a talking machine, the combination with a cylindrical record holder constructed with provision for receiving detachably and securing, on its exterior, a longitudinally alined series of records, of supporting and retaining means for said holder including a member underlying the end of said holder, and a complemental member connected displaceably with the first member, overlying the said end of the holder, and adapted to be displaced to release the record holder, said members and the record holder having interengaging portions or devices arranged to prevent movement of the holder endwise relatively to the retaining means.

20. In a talking machine, the combination of a record holder, and a support for an end thereof, said holder and support having interengaging portions arranged at the periphery of the record holder and constructed to retain the holder against endwise movement while permitting it to rotate, said holder being so constructed externally that record members may fit on its outer surface, and may be slipped over its end.

21. In a talking machine a record holder, supporting means engaging the under side of said holder peripherally adjacent to the end thereof, displaceable retaining means overlying said holder, and resilient means urging said retaining means toward said supporting means and thereby holding the record holder with a resilient pressure on the supporting means.

22. A machine of the character described comprising a substantially cylindrical record holder, supporting frames embracing said holder at the ends, and under the same, members on said supporting means, directly engaging the record holder, and retaining means connected to said supporting means, overlying the record holder, and mounted with provision for removal, in order to leave said record holder unobstructed, whereby it may be removed from the supporting means, the said engaging members and record holder being constructed to prevent axial movement of the record holder.

23. A machine of the character described including in its construction a substantially cylindrical hollow record holder, a sound reproducing device, means for conducting vibrations from said device into the record holder, supporting means underlying said holder and engaging the exterior thereof adjacent to its ends, and retaining means connected with said supporting means, overlying and engaging the record holder to retain the latter on the supporting means, and being displaceable to permit removal of the record holder.

24. The combination of a hollow record holder and holding means therefor, said record holder being cylindrical and the holding means comprising supports encircling the ends of the record holder and having peripheral engagement therewith, said holding means including displaceable members mounted with provision for displacement whereby to permit unobstructed removal of the record holder, and being arranged to prevent endwise movement of the holder.

25. A talking machine comprising in combination a cylindrical record holder, supporting means underlying and engaging the holder externally and peripherally on which said holder lies, and displaceable retaining means engaging said holder and maintaining it in engagement with said supporting means, said retaining means being resiliently urged toward the supporting means.

26. A talking machine including in combination a cylindrical record holder, supporting means underneath the holder engaging the same peripherally, on which said record holder lies, retaining means overlying said record holder also engaging the same peripherally and maintaining the same upon said supporting means, and a resilient connector between said supporting means and retaining means, arranged and operating to hold the latter in yielding engagement with the record holder.

27. A talking machine comprising in combination a substantially cylindrical record holder, supports underlying said holder adjacent the ends thereof, whereby the latter is supported, a retaining member pivotally connected to each said support adapted to be swung over the record holder to retain the same on the support and to be swung aside to leave the record holder unobstructed for removal from said supports, and latches for maintaining said retaining means in their operative position, said latches being resiliently yielding to cause said retaining means to act yieldingly upon the record holder.

28. In a talking machine the combination with a cylindrical rotatable record holder, supports therefor underlying and peripherally engaging the record holder, retaining means overlying and peripherally engaging the record holder for holding said record holder upon said supports, yielding means pressing said retaining means yieldingly against the record holder, and means for adjusting the tension of said yielding means.

29. In a talking machine, a rotatable cylindrical record holder, a support underlying an end of said holder, on which the holder is adapted to rotate, said support and the holder having means for preventing endwise movement of the holder, and means for retaining the holder on the support.

30. In a talking machine a rotatably mounted record holder, a support extending under the record holder on which said record holder lies, and means acting transversely of the axis of the record holder for resiliently retaining said record holder on said support, said resilient retaining means being displaceable to permit unobstructed removal of the record holder from the support.

31. In a talking machine a cylindrical record holder, supporting means on which said record holder rests at points adjacent to its ends, retaining members connected to said supporting means located adjacent to the opposite ends of the record holder, respectively, and movable across and away from the record holder for respectively retaining and releasing the same, to permit removal of the record holder, and connecting members parallel to the axis of the record holder between said retaining members, connecting said retaining members, so that they may thus move as a unit, one of said connecting members being a lead screw.

32. In a talking machine a cylindrical record holder, supporting means on which said record holder rests at points adjacent to its ends, retaining members connected to said supporting means located adjacent to the opposite ends of the record holder respectively, and movable across and away from the record holder for respectively retaining and releasing the same to permit removal thereof, and connecting members, parallel to the axis of the record holder, between said retaining members, connecting said retaining members so that they may thus move as a unit.

33. A talking machine including in combination a hollow record holding cylinder open at both ends adapted to rotate and to hold a phonograph record, a sound reproducing device, a feed screw for causing said sound reproducing device to travel, and transmission mechanism, one member of which is fixed on the record holder, surrounding one end opening thereof driven by the record holder, in gear with the feed screw, for rotating the latter, in combination with means for conducting sound vibration from said reproducing device into the record holder, 34. In a talking machine a rotatably mounted record holder open from end to end, a sound reproducing device adapted to be vibrated by the undulations of a groove in the face of a phonograph record carried by said holder, a feed screw, connecting means between said feed screw and sound reproducing device whereby the latter is driven by the former transversely of the sound groove, and mechanism including an annular driving element surrounding one end opening of the record holder driven by said record holder in its rotation for actuating the feed screw, in combination with means for conducting sound vibrations from said reproducing device into the record holder.

35. A phonograph including in combination a rotatably mounted cylindrical record holder, a worm carried by said holder surrounding one end thereof, a feed screw arranged parallel to the axis of said holder, a sound reproducing device engaged and driven by said feed screw, a transverse shaft extending from a point near said feed screw to a point near said worm, a worm wheel mounted on the shaft engaging said worm, and gearing between the shaft and feed screw, whereby the latter is driven at a predetermined relatively slow rate of rotation by the record holder, with elimination of objectionable noise.

36. In a phonograph, the combination with a record holder, of means for supporting said holder including a displaceable frame embracing a part of the holder, a feed screw carried by said displaceable frame, a driving gear element connected with said holder, and transmission gearing, for driving said feed screw, carried by said displaceable frame and arranged to be brought into and out of mesh with the driving gear element when said frame is placed in operative position and displaced, respectively.

37. In a phonograph, the combination with a record holder, of a support for said holder surrounding and engaging an end thereof, a sound reproducer, a feed screw for said sound reproducer having a bearing in said support, a transverse shaft, a bracket connected with said support in which said transverse shaft is held rotatably, intermeshing gears connected with said feed screw and transverse shaft respectively, a worm secured to the record holder, and a worm wheel secured to the transverse shaft and meshing with said worm, the worm, worm wheel, shaft, and gears constituting a mechanism by which the feed screw is driven at a speed proportional to the rotation of the record holder.

38. In a phonograph, the combination with a record holder, of means for supporting said holder, including a displaceable frame member arranged to embrace an end of the holder, a feed screw having a bearing in said frame member, a driven gear element carried by said screw adjacent to the end of the holder, a driving gear element secured to the holder at the end thereof to which said driven gear element is adjacent, and transmission gearing carried by said frame member in driving connection with the driven gear element and so arranged as to mesh with the said driving gear when the frame member is in place.

39. A talking machine comprising a cylindrical record holder, a worm connected at one end of said holder, a frame including a displaceable embracing portion in which said holder is rotatably mounted and by which it is supported and held, a feed screw held in the displaceable portion of said frame extending longitudinally of the record holder, a sound reproducing device in driving engagement with said feed screw adapted to be fed by the latter along the record holder, an intermediate shaft mounted on the displaceable portion of said frame, a worm wheel carried by said shaft and meshing with said worm, and intermeshing gears on said shaft and screw.

40. In a phonograph the combination of a rotatable cylindrical record holder, a supporting frame in which said holder is contained, said supporting frame having a displaceable portion overlying the holder and adapted to be displaced, to permit removal of the holder, a feed screw rotatably mounted in said portion of said frame, an intermediate shaft mounted upon said frame and geared with said feed screw, a worm wheel carried by said shaft, and a worm connected with the record holder, said worm wheel being brought into mesh with said worm when the displaceable portion of said frame is in normal position, and being removed from the worm when said portion is displaced.

41. In a phonograph, the combination of a substantially cylindrical rotatable record holder, a worm carried by said holder, a supporting frame by which said holder is supported, including a pivotally connected portion adapted to overlie the record holder and to be swung aside therefrom, a feed screw carried by said pivotally mounted portion, a transmission shaft also carried by said portion and being geared to said feed screw, and a worm wheel mounted on said transmission shaft in such a position as to be brought into mesh with said worm when said portion is caused to overlie the record holder, the said worm wheel being disengaged from the worm when said portion is swung aside.

42. A talking machine comprising in combination a record holder having a hollow interior and supported to rotate, a stationary horn section mounted adjacent to one end of said record holder and having a passage arranged to direct sound waves into the interior of said holder, swinging horn sections connected swivelly with said stationary horn section and with each other, and a sound reproducing device connected with the entrance end of said sections and adapted to coöperate with a record carried by said record holder.

43. A sound reproducing machine comprising in combination a tubular rotatably mounted record holder having a hollow interior, a sound reproducing device adapted to travel along said record holder, a horn section carrying said sound reproducing device, a second horn section swiveled to said first horn section, and a third section to which the second horn section is connected swivelly, said third horn section being rigidly mounted adjacent to one end of the record holder and having an internal passage communicating with the second horn section and arranged to direct sound waves into the record holder.

44. In a talking machine, a record holder formed as a hollow shell of regular form, said holder being also a section of an amplifying horn, and having admission and emission openings at opposite ends.

45. In a talking machine, a tubular record holder, which is also a part of a sound amplifying horn and has a hollow interior with end openings, and means for supporting said holder in such manner as to leave its end openings unobstructed.

46. In a phonograph, the combination with a record holder adapted to mount a phonographic record on its exterior, and having a hollow interior whereby to permit travel of sound waves through it, a sound reproducer adapted to travel along the face of a record mounted on said record holder, and a horn for conducting sound vibrations from said reproducer to a point from which such vibrations may be directed exclusively through the record holder.

47. In a phonograph, the combination with a record holder adapted to mount a phonographic record on its exterior, and having a hollow interior adapted to permit travel of sound waves through it, a sound reproducer adapted to travel along the face of a record mounted on said record holder, and a horn for conducting sound vibrations from said reproducer to a point from which such vibrations may be directed exclusively through the record holder, said conducting horn being composed of sections connected together with provision for relative movement, whereby to permit such travel of the sound reproducer and at the same time maintain the vibration transmitting continuity of the horn.

48. In a talking machine, a tubular record holder, which is also a part of a sound amplifying horn and has a hollow interior with end openings, means for supporting said holder in such manner as to leave its interior unobstructed, a stationary horn section mounted at one end of said holder and having a passage registering with one of the openings in the latter, articulated horn sections supported by said stationary section, and a sound reproducing device carried by said sections and adapted to co-act with a record mounted on said holder.

49. In a talking machine, the combination of a record holder of cylindrical form, a sound reproducing device adapted to co-act with records mounted on said holder, and an amplifying horn extending from said sound box, including articulated sections and a terminal section contained within the record holder.

50. In a talking machine, a hollow cylindrical record holder mounted to rotate about its axis and open at both ends, a support for an amplifying horn formed as a hollow elbow in registry with one end opening of the record holder, a horn section swiveled to said support, a second horn section swiveled to the first section, and a sound reproducer connected to the second section; said sections, support, and record holder forming a continuous sound-conducting passage and arranged to hold said reproducer adjacent to a record carried by the holder, and to permit travel of the reproducer longitudinally of the holder.

51. In a phonograph, a tubular rotatable record holder which is also a section of an amplifying horn, said holder being open at both ends, a stationary horn section communicating with the record holder, and a driving element for rotating said record holder, connected thereto between the same and the stationary section.

52. In a phonograph, a rotatable record holder adapted to carry a plurality of ring like records in alinement having discontinuous record grooves with intermediate ungrooved surfaces, a sound reproducer having a device for engaging the grooves of such records, positive mechanism for driving said reproducer in the general direction of the length of said holder at a speed which bears a predetermined ratio to the speed of rotation of the holder, and means additional to said driving mechanism for causing said reproducer to be displaced from and returned to the surfaces of said records in passing from one groove to the next.

53. In a phonograph, a rotatable record holder adapted to carry a plurality of ring like records in alinement, a sound reproducer having a device for engaging the recorded surfaces of such records, a lead screw of uniform diameter approximately parallel to said holder, a nut connected with said reproducer having a plurality of ribs and grooves simultaneously engaged with several turns of the thread of said screw, and means for turning said nut and the reproducer about the screw as an axis to separate the reproducer from the surface of a record on the holder.

54. In a phonograph, an amplifying horn and means for rotating the walls of said horn about the body of air contained within the horn.

55. In a phonograph, a rotating record holder adapted to carry a series of ring shaped records in axial alinement, a reproducing device adapted to engage such records, means for causing said reproducing device to travel across such records and from one record to the next, and means additional to the travel-causing means for displacing said reproducing device from the record when passing from one to another, the said travel-causing means being constructed to propel the reproducing device at the same speed when so passing as when traveling across a record.

56. In a phonograph, a rotating record holder adapted to carry a series of ring shaped records in axial alinement, a reproducing device adapted to engage such records, guiding means arranged to confine the travel of the reproducer to a path bearing a definite relation to the longitudinal dimension of the surface of the record holder, means arranged to cause displacement of the reproducer from the record holder in crossing the portion thereof where two adjacent records most nearly meet, and mechanism for positively propelling said reproducer across the records and over said displacement-causing means at uniform speed.

57. In a phonograph, a rotatable record holder adapted to carry a plurality of ring like records in alinement, a sound reproducer having a device for engaging the recorded surfaces of such records, a screw of uniform diameter and pitch extending approximately parallel to said holder and geared thereto so as to rotate at a speed proportional to that of the holder, a nut engaging simultaneously several of the threads of the screw, to which said reproducer is connected, and means for withdrawing said reproducer from the surface of a record when passing from such record to the next one while permitting said nut at the same time to remain in mesh with the screw.

58. In a phonograph, a rotatable record holder adapted to carry a plurality of ring like records in alinement, a sound reproducer having a device for engaging the recorded surfaces of such records, a screw extending approximately parallel with said holder, means for rotating said screw at a rate proportional to that of the holder, a nut engaged with said screw and connected with the reproducer to propel the latter, a guide member beside the screw, an extension from the nut bearing on said guide member and caused thereby to hold the reproducer in the desired relation to the surfaces of records on the holder, and cam members projecting from said guide member arranged to be engaged by said extension.

59. In a phonograph, a rotatable cylindrical record holder, a screw of uniform diameter extending substantially parallel with said holder, a nut engaging the threads of said screw, means for driving the screw, a reproducer connected with said nut, and arranged to coact with the surface of a record carried by said holder, and means external to the screw for so turning the nut and reproducer about the axis of the screw as to remove the reproducer from the record holder.

60. In a phonograph, a rotatable cylindrical record holder, a screw of uniform diameter extending substantially parallel with said holder, a nut having a plurality of helical ribs and grooves engaging at the same time several turns of the screw thread, means for driving the screw, a reproducer connected with said nut, and arranged to coact with the surface of a record carried by said holder, and means external to the screw for so turning the nut and reproducer about the axis of the screw as to remove the reproducer from the record holder while retaining all of said ribs in continuous mesh with a like number of the turns of the screw thread.

61. In a phonograph, a rotatable cylindrical record holder, a screw of uniform diameter extending substantially parallel with said holder, a nut engaging the threads of said screw, means for driving the screw, a reproducer connected with said nut, and arranged to coact with the surface of a record carried by said holder, and means for turning the nut and reproducer about the screw, and maintaining the nut always at the same distance from the axis of the screw, to displace the reproducer from the record holder.

62. In a phonograph, a record holder, a sound reproducer, a lead screw, a nut meshing with the thread of said lead screw and connected with the reproducer so as to propel the latter, a guide parallel with the lead screw, means connected with the nut and being in engagement with said guide for controlling the path in which the reproducer travels, and means associated with said guide for so turning the nut about the screw as to shift the reproducer away from the holder.

63. In a phonograph, a record holder, a sound reproducer, a lead screw, a nut meshing with the thread of said lead screw and connected with the reproducer so as to propel the latter, a guide parallel with the lead screw, an arm extending from the nut into engagement with the guide, and offsets on said guide arranged to move said arm so as to turn the nut about the screw and thereby move the reproducer away from and toward the record holder.

64. In a talking machine having a cylindrical record holder, supporting means therefor consisting of frames arranged to surround the end portions of said holder, each frame having a fixed portion and a pivoted portion, and a combined connector for said frames, and pivot for said frame sections, consisting of a tube running between the pivot joints of the two frames, a bushing in each said joint in line with said tube, and a screw passing through each bushing into threaded engagement with the end of the tube.

65. In a talking machine having a cylindrical record holder, supporting means therefor consisting of frames arranged to surround the end portions of said holder, each frame having a fixed portion and a pivoted portion, and a combined connector for said frames, and pivot for said frame sections, consisting of a tube running between the pivot joints of the two frames, a bushing in each said joint in line with said tube, and a screw passing through each bushing into threaded engagement with the end of the tube, each bushing having a flange and each screw a head between which the pivotally connected portions of the frame are held.

66. In a phonograph, the combination of a tubular record holder which is also a horn section, a stationary elbow-shaped horn section in communication with one end of said record holder, a third horn section connected to said elbow section in a manner permitting it to extend over the record holder, a fourth horn section connected movably to said third section, and a sound box connected to the outer end of the last-named section, the connection of the third and fourth sections being of a character to permit movement of the sound box longitudinally of the record holder.

67. In a phonograph, the combination of a tubular record holder which is also a horn section, a stationary elbow-shaped horn section in communication with one end of said record holder, a third horn section connected to said elbow section by a swivel of which the axis is approximately perpendicular to the axis of the record holder in a manner permitting it to extend over the record holder, a fourth horn section connected movably to said third section, by a swivel of which the axis is parallel to that of the first-named swivel, and a sound box connected to the outer end of the last-named section, the connection of the third and fourth sections being of a character to permit movement of the sound box longitudinally of the record holder.

68. In a talking machine, in combination with a record holder, an amplifying horn support, a ring secured to said horn support and having an inwardly turned flange, a sleeve contained within said ring having an outwardly turned flange located between the first named flange and the end of the horn support, a series of balls contained between support, a series of balls contained between said flanges, a ring secured upon said sleeve, a series of balls between said ring and the first-named flange, a horn section to which said ring is secured, a second horn section swiveled to the before-named section, and a sound reproducing device carried by said second horn section and adapted to travel across the face of the record holder.

69. In a talking machine, in combination with a record holder, an amplifying horn support, a horn section swiveled to said support, a second horn section having an end substantially abutting on the end of the first-named horn section, rings threaded upon the adjacent ends of said horn sections, one of said rings having an outwardly projecting lip or flange, locking devices for securing both of said rings in their adjustments, a series of balls contained between said lip and the other ring, a sleeve secured to the last named ring surrounding said lip and having an inwardly turned flange overlying the same, and a series of balls contained between said flange and the lip.

70. In a phonograph, a plurality of horn sections, a ball bearing consisting of a plurality of members, one of which is connected adjustably to one horn section, and another of which is connected adjustably to the other section, and means for locking said members to the respective horn sections.

71. A phonograph including a substantially cylindrical record holder which is hollow in its interior and open from end to end, a sound reproducer adapted to travel across the faces of records mounted on said holder, means for conducting sound vibrations from said reproducer to one end of and into said record holder, and supporting means engaging the end portions of said holder, constructed to leave the end openings thereof unobstructed.

72. In a phonograph, a substantially cylindrical record holder open from one end to the other to constitute a horn section, a sound reproducer, means for conducting sound vibrations from said reproducer to one end of said holder, supports on which the record holder lies in a substantially horizontal position and on which it is rotatable, and displaceable retaining members connected to said supports and overlying the record holder, so arranged as to leave the ends thereof unobstructed.

73. In a phonograph, a substantially cylindrical record holder open from one end to the other to constitute a horn section, means for supporting said holder in a substantially horizontal position with capability of rotating, one end of the holder having a smooth face perpendicular to its axis surrounding the opening in that end, and a fixed horn section having a mouth arranged to make close contact with the holder face surrounding the opening therein.

74. In a phonograph the combination with a sound reproducing device having means for vibrating a column of air, means for conducting sound vibrations from said reproducing device, a sound amplifying member to which said vibration conducting means lead, and mechanism for rotating the walls of said amplifying member about the body of air contained within said member.

75. In a talking machine the combination with a cylindrical record holder adapted to support a record on its exterior, having runways adjacent to its opposite ends open externally of the holder, supporting frames adjacent to such opposite ends, means on said supporting frames entering said runways and supporting the record holder, and a sound reproducing device located outside of the holder.

76. A phonograph having in combination with a sound-reproducing device, a sound amplifying member or horn in connection with said reproducing device mounted with provision for rotation about an axis contained within its walls and within the rim of its mouth, and means for preventing movement of said horn longitudinally of said axis.

77. A phonograph having in combination with a sound-reproducing device, a sound amplifying member or horn in connection with said reproducing device mounted with provision for rotation about an axis contained within its walls and within the rim of it mouth, and means for continuously rotating said horn about said axis.

78. A phonograph having in combination with a sound-reproducing device, a sound amplifying member or horn in connection with said reproducing device mounted with provision for rotation about an axis contained within the walls and within the rim of its mouth, and means for supporting said horn and retaining it in the same position while thus rotating.

79. In a phonograph the combination of a cylindrical rotating record holder, an annular record member of which the external suface approximates nine inches in diameter and bears a helical record groove, and a sound - reproducing device having a stylus adapted to enter said groove and to be vibrated thereby.

80. In a phonograph the combination with a cylindrical rotatable record holder, a plurality of annular record members surrounding said holder in axial alinement, the inner surfaces of said record members being cylindrical whereby the members may be interchanged and placed in any desired order, the outer surfaces of said members approximating nine inches in diameter and each containing a helical record groove recording a complete sequence of sounds, and a reproducing device having a stylus adapted to enter the grooves of the record members and to be vibrated thereby.

81. In a phonograph the combination with a cylindrical rotatable record holder, a plurality of annular record members surrounding said holder in axial alinement, the inner surfaces of said record members being cylindrical whereby the members may be interchanged and placed in any desired order, the outer surfaces of said members approximating nine inches in diameter and each containing a helical record groove recording a complete sequence of sounds, and a reproducing device having a stylus adapted to enter the grooves of the record members and to be vibrated thereby, means for propelling said reproducing device longitudinally of the record holder, and means for removing said device and the stylus from the surface of the records at the end of the groove in each record, and returning the same into the beginning of the groove of the next adjacent record.

In testimony whereof I have affixed my signature, in presence of two witnesses.

GEORGE W. BOWERS.

Witnesses:
Arthur H. Brown,
P. W. Pezzetti.